(No Model.)

E. WESTON.
ELECTRICAL MEASURING INSTRUMENT.

No. 446,489. Patented Feb. 17, 1891.

WITNESSES:
Gustave Dieterich
Edgar Goodwin

INVENTOR
Edward Weston
BY
ATTORNEY

UNITED STATES PATENT OFFICE.

EDWARD WESTON, OF NEWARK, NEW JERSEY, ASSIGNOR TO THE WESTON ELECTRICAL INSTRUMENT COMPANY, OF SAME PLACE.

ELECTRICAL MEASURING-INSTRUMENT.

SPECIFICATION forming part of Letters Patent No. 446,489, dated February 17, 1891.

Application filed March 17, 1888. Serial No. 267,474. (No model.)

*To all whom it may concern:*

Be it known that I, EDWARD WESTON, of Newark, Essex county, New Jersey, have invented a new and useful Improvement in Means for Retarding or Opposing the Movement of Bodies in a Magnetic Field, of which the following is a specification.

It is a well-known fact that when a continuous body of diamagnetic metal—such as copper—is suspended between the poles of a magnet it finds in the field of force a powerful resisting medium, which opposes any motion of the metal and speedily brings it to rest. My invention depends upon this phenomenon; and it consists, broadly, in the combination, with a body arranged to move in a field of force, of a second continuous body of diamagnetic metal united to said first body, and also disposed in said field of force. The effect of the diamagnetic mass, which partakes of the motion of the body to which it is connected, is to retard and oppose the movement of said last-mentioned body, and so act practically in manner analogous to a dash-pot or brake in a mechanical device.

I illustrate my invention herein embodied in an instrument for the measurement of electro-motive force.

It is to be understood that I do not in anywise limit my invention to use in such an apparatus, because it is susceptible of a very wide range of applications. It is, however, exceedingly efficient and useful in such a device as is here set forth.

Figure 1:
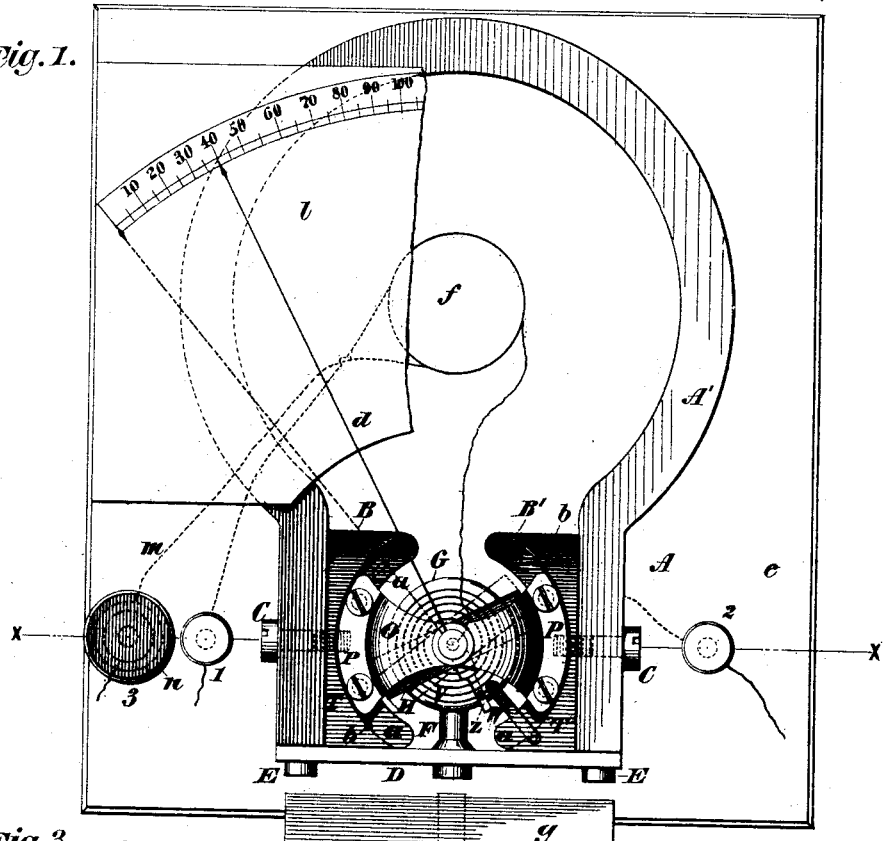
Figure 3:
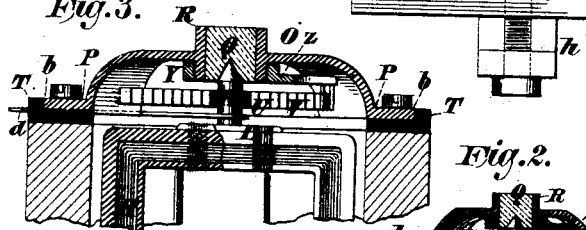
Figure 2:
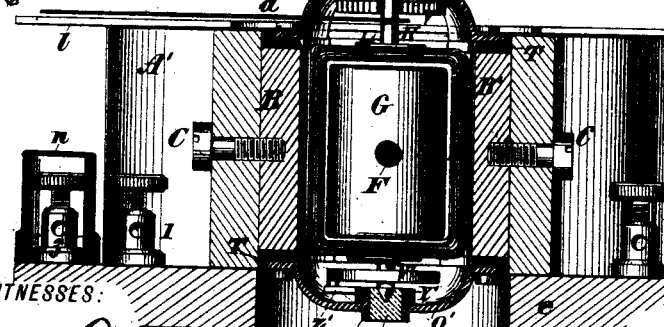
Figure 4:
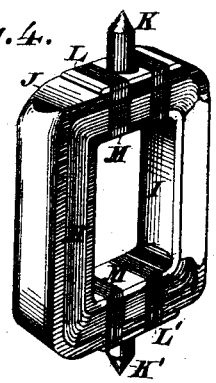

In the accompanying drawings, Figure 1 is a plan view of my said measuring-instrument with a portion of the scale-plate broken away. Fig. 2 is a section on the line *x x* of Fig. 1, and Fig. 3 is a partial section on the same line on a larger scale than Fig. 2. Fig. 4 is a perspective view of the coil separately.

Similar letters and figures of reference indicate like parts.

A is a permanent magnet having a circular body A' and pole-pieces B B', secured in place by screws C. The opposing faces of the pole-pieces B B' are concave, so that between said pole-pieces a substantially cylindrical opening is produced.

D is a brass bar secured to the magnet by bolts E. From said bar extends a pin F, which supports a cylinder G of iron, which cylinder is concentrically disposed with reference to the cylindrical space between the pole-pieces B B'. There is an annular interval between the periphery of said cylinder and the faces of the pole-pieces.

H is a hollow coil of insulated wire, which incloses a frame I of copper or other diamagnetic metal, and is itself inclosed in a frame J of similar material, as shown in Fig. 4. Each side or face of the coil is also covered with a plate of copper, so that the whole coil is therefore inclosed on all sides in an envelope of diamagnetic metal.

To the frame J at opposite ends are secured by wrappings of silk thread M metal plates L L', to which are fixed pivot-pins K K' of metal. One end of the wire composing the core H connects to the plate L and the other end of said wire to the plate L'.

O O' are bridge-pieces having flanges P, received in recesses in blocks of insulating material T, attached to the pole-pieces B B' and resting against shoulders *b*. At the central points of said bridges are fixed sleeves R, which receive jewels Q, in which jewels the conical ends of the pivot-pins K K' freely turn. The fixed cylinder G then is supported in the hollow space inside of the inner frame I, and the coil H surrounds said cylinder and turns in the annular space between the cylinder periphery and the pole-pieces B B'. Surrounding the pivot-pins K K' are tight washers or rings U U', to which rings are fastened the inner ends of coiled springs V V'. The outer ends of springs V V' are held in arms W, which are secured to the insulating-blocks T. The sleeves R extend beyond the inner faces of the bridges O O' and receive upon them rings Y Y', which rings carry arms Z Z'. On each arm are two short pins, between which pins the coiled spring is received. The rings Y Y' are a close fit upon the sleeves R, but may be turned on said sleeves. In this way the arms Z Z' may operate to lengthen or shorten the active part of the springs. To the pivot-pin K is secured a light needle *d*, which extends over a plate *l*, upon which is inscribed a scale of regular divisions. In the case *e* of the instrument is a resistance-coil *f*.

The circuit in the instrument proceeds from the binding-post 1 on the base-board to and through the resistance-coil $f$ to bridge O, arm Z, spring V, ring U, pin K, plate L, coil H, plate L', pin K', ring U', spring V', arm Z', bridge O', and binding-post 2.

The coil H, which is free to move on the pivots in the field of the magnet, is an assemblage of parallel loops in the current. The whole space occupied by a loop when a current traverses the wire behaves, as is well known, like a magnetic shell—that is, as if the loops and inclosed space were simply a magnet in slab form, one face of the magnet exhibiting north, the other face of the magnet south, polarity. Hence when a current circulated through the coil it will tend to turn on its pivots. If, however, to the motion of the coil a constant resistance is opposed always directly proportional, or nearly so, to the extent of its travel, then the core will move only to a point at which equilibrium exists between the force which moves it and the force which opposes its motion. The magnitude of the moving force is directly proportional to the current strength. The opposing force to the movement of the coil is the resiliency of the coiled springs V V', which are wound up, so to speak, as the coil turns. Hence the extent of movement of the coil, as shown on the scale, will measure the current strength, because the coil will come to rest at a point where the resistance of the spring and the moving force of the current balance. The resistance $f$, which is in the circuit, is very large in proportion to the internal resistance of the dynamo or battery, the current pressure of which is to be measured. Consequently the coil H will move, and the needle $d$ will swing over distances on its scale exactly proportional to the electro-motive force of the current traversing the coil H.

The coil H, as already explained, is inclosed in copper. This mass of diamagnetic metal moving in the field retards the movement of the coil and renders the instrument "dead beat," the needle simply moving to the point on the scale corresponding to the number of volts of electro motive force of the current and remaining there. The coil H and diamagnetic metal united thereto is here shown in the field of a permanent magnet, and hence in an always uniform field, so that the dampening effect of the copper is the same in all positions of the coil.

Directly in front of the polar extremities of magnet H is a bar $g$ of iron or other magnetic material, which, by means of the adjusting-screw $n$, may be moved at will, nearer to or farther from said extremities of the magnet.

At 3 is shown a binding-screw provided with a cap $n$, which connects by a wire $m$ with the interposed resistance-coil $f$ at some predetermined point thereon, so that a current proceeding from said post 3, through the instrument, does not traverse the entire coil, but only some known fraction of it. This is useful for calibration purposes.

I claim—

1. A means of producing a field of force, (such as a magnet,) a movable body in said field, and a continuous mass of diamagnetic metal also in said field and connected to and operating to retard or oppose the motion of said movable body, substantially as described.

2. A means of producing a field of force, (such as a magnet,) a continuous mass of diamagnetic metal, and an electrical conductor in loop or coil form, the said conductor and mass being united and movably supported in said field of force and the said mass operating to retard or oppose the motion of said conductor.

3. A permanent magnet, a movable body, and a continuous mass of diamagnetic metal supported and movable in said field and connected to and operating to retard or oppose the motion of said movable body, substantially as described.

4. A permanent magnet, a paramagnetic body, and a continuous body of diamagnetic metal, the said bodies being united and movably supported in the field of force of said magnet and the said diamagnetic body operating to retard or oppose the motion of said paramagnetic body, substantially as described.

EDWARD WESTON.

Witnesses:
PARK BENJAMIN,
EDGAR GOODWIN.